United States Patent [19]

Ishii et al.

[11] Patent Number: 4,907,556
[45] Date of Patent: Mar. 13, 1990

[54] ELECTRONIC CONTROL SYSTEM FOR INTERNAL COMBUSTION ENGINE

[75] Inventors: Shoso Ishii; Minoru Kuriyama, both of Hiroshima; Yukinobu Nishimura; Setsuhiro Shimomura, both of Himeji, all of Japan

[73] Assignee: Mitsubishi Denki Kabushiki Kaisha, Tokyo, Japan

[21] Appl. No.: 255,281

[22] Filed: Oct. 11, 1988

[30] Foreign Application Priority Data

Oct. 14, 1987 [JP] Japan .................................. 62-258763

[51] Int. Cl.$^4$ ............................................. F02D 41/00
[52] U.S. Cl. .................................... 123/486; 123/478; 123/494
[58] Field of Search ............... 123/478, 486, 488, 480, 123/494

[56] References Cited

U.S. PATENT DOCUMENTS 4,112,879  9/1978  Assenheimer et al. ............. 123/478
4,582,031  4/1986  Janetzke et al. ................. 123/478 X
4,785,785  11/1988 Oba et al. ........................... 123/488

Primary Examiner—Tony M. Argenbright
Attorney, Agent, or Firm—Sughrue, Mion, Zinn, Macpeak and Seas

[57] ABSTRACT

An electronic control system for an internal combustion engine, in which parameters necessary for the engine control are found by use of auxiliary quantities to thereby control the operating characteristic quantities of the internal combustion engine, the electronic control system comprising: a memory device for storing in advance, in the form of a two-dimensional map, a charging efficiency per se or related values of the charging efficiency corresponding to a degree of opening of the throttle valve and a number of engine revolution under the reference atmospheric condition; and a computing device for computing atmospheric pressure related values which include therein at least the atmospheric pressure value and are dependent on the atmospheric pressure, in accordance with a predetermined computation equation which takes a ratio of the charging efficiency per se or related values of the charging efficiency to be found out by selective use of signals of the intake air flow rate and a number of revolution of the internal combustion engine.

5 Claims, 8 Drawing Sheets

ELECTRONIC CONTROL SYSTEM FOR INTERNAL COMBUSTION ENGINE

BACKGROUND OF THE INVENTION

1. Field of the Invention

This invention relates to an electronic control system for the internal combustion engine of a type, in which those values related with the atmospheric pressure such as the atmospheric pressure value, and so forth are found by computation of other control parameters of the internal combustion engine, and by use of these computed values as the auxiliary parameters for the control of the engine.

2. Discussion of Background

In the following, a conventional electronic control device for the internal combustion engine will be explained in reference to FIGS. 1 and 2 of the accompanying drawing which illustrate one preferred embodiment of the electronic control system according to the present invention.

In FIG. 1, a reference numeral 1 designates an internal combustion engine which is mounted on an automobile, for example, and in which only one cylinder is shown out of a plurality of cylinders; a numeral 2 refers to a cylinder of the internal combustion engine; a numeral 3 refers to an air inlet valve to be actuated by a cam (not shown in the drawing); a reference numeral 4 denotes an intake manifold of the internal combustion engine 1; a numeral 5 refers to an injector provided on each cylinder of the intake manifold 4; a reference numeral 6 represents a surge tank connected to the upstream side of the intake manifold 4; a numeral 7 refers to a throttle valve provided in the air inlet passage at the upstream of the surge tank 6 and for controlling the quantity of intake air into the internal combustion engine 1; a reference numeral 8 denotes a sensor connected to the throttle valve 7 and for detecting a degree of opening of the throttle value 7; a numeral 9 refers to a bypass which functions to detour both upstream and downstream of the throttle valve 7; a reference numeral 10 designates a bypass air quantity regulator provided in the bypass 9; a reference numeral 11 denotes a hot-wire type air-flow sensor (hereinafter abbreviated as "AFS") which is provided at a location further upstream of the throttle valve 7 and for detecting a flow rate of air to be taken into the internal combustion engine by means of, for example, a temperature-dependent-resistor; a reference numeral 12 indicates an air temperature sensor for detecting temperature of the inlet air before it passes through the AFS 11; a numeral 13 refers to an air cleaner provided at an inlet port situated at a position further upstream of the AFS 11 and the intake air temperature sensor 12; a numeral 14 refers to a water temperature sensor which is provided in the cooling water passage of the internal combustion engine 1 and for detecting temperature of the water; a reference numeral 15 denotes a crank angle sensor for detecting a predetermined crank angle of the internal combustion engine 1; a numeral 16 refers to a neutral detection switch for detecting that no load is imposed on the internal combustion engine 1; and a reference numeral 17 designates an electronic control unit (hereinafter abbreviated as "ECU") which determines a fuel injection quantity based on output signals mainly from the AFS 11, the water temperature sensor 14 and the crank angle sensor 15, and controls the injector 5 in synchronism with the output signal from the crank angle sensor 15 to thereby carry out the fuel injection, at which time each of the output signals from the throttle opening degree sensor 8, the air temperature sensor 12 and the neutral detection switch 16 is used in the ECU as the auxiliary parameter. The ECU 17 also controls the bypass air quantity regulator 10, although the details of its operation are omitted.

FIG. 3 is an enlarged schematic diagram of the air intake section shown in FIG. 1. In the drawing, Ta denotes an atmospheric temperature; Pa represents an atmospheric pressure; Qa designates an air flow rate to be measured by the AFS; $\theta$ denotes a degree of opening of the throttle valve 7; $S(\theta)$ indicates an area for the air passing through the throttle section when the degree of opening of the throttle valve is $\theta$; and Ps denotes an internal pressure of the surge tank 6.

FIG. 8 is a block diagram showing the internal structure of the ECU in the conventional electronic control system, while FIG. 9 is a graphical representation with a pressure ratio Pa/Ps being taken on the abscissa and with a value "f" to be explained later being taken on the ordinate.

The conventional electronic control system of the above-described construction is disclosed in, for example, unexamined Japanese Patent Publication No. 162341/1984.

In the following, explanations will be given as to the operations of this conventional electronic control system. A function generator 17a, which has introduced therein an input signal $\theta$ of the throttle valve opening degree as detected by and outputted from the throttle valve opening degree sensor 8, produces, as an output therefrom, a signal of a ratio of an air flow rate value $Q_0$ with respect to the atmospheric pressure value $P_0$ under the reference atmospheric condition in correspondence to the input signal into the function generator. This signal is introduced as an input into a division circuit 17b together with an air flow rate signal Qa, and a value of $Qa \div (Q_0/P_0)$. An output from this division circuit 17b corresponds to a value Pa.f. Here, the following equation will be established with K as a ratio of specific heat:

$$f = \frac{\sqrt{\left(\frac{Ps}{Pa}\right)^{\frac{2}{K}} - \left(\frac{Ps}{Pa}\right)^{\frac{K+1}{K}}}}{\sqrt{0.52828^{\frac{2}{K}} - 0.52828^{\frac{K+1}{K}}}}$$

$$= 3.864 \sqrt{\left(\frac{Ps}{Pa}\right)^{\frac{2}{K}} - \left(\frac{Ps}{Pa}\right)^{\frac{K+1}{K}}}$$

The value of Pa.f is introduced into the division circuit 17d together with the air inlet tube pressure signal Ps to be obtained from an input terminal 17c. A signal obtained from the division circuit 17d is introduced as an input into a subsequent comparison unit 17e where a pressure ratio of Ps/(Pa.f) and a fixed value "a" of, for example, 0.52828 are compared. As it will be seen from reference to FIG. 9, in a region of M (Mach number)=1 (which is below the fixed value "a" on the march of Ps/Pa=a), there takes place a sonic choke and the value "f" takes a constant value; on the other hand, in a region of M<1 (which is above the value "a"), the value "f"

varies. On account of this, a switch $17f$ is opened or closed in accordance with the result compared by the comparison unit $17e$. If $Ps/(Pa.f) < a$, there is established, from the graphical representation of FIG. 9, a hypothesis of $f=1$, for example, and the switch $17f$ is closed, whereby the atmospheric pressure value Pa is produced as an output from the division circuit $17b$ by way of the switch $17f$. In the case of $Ps/(Pa.f) \geq a$, the switch $17f$ is opened, because no hypothesis of, for example, $f=1$ is established.

The conventional electronic control system for the internal combustion engine is constructed as described in the preceding, wherein use is made of a phenomenon such that the value "f" becomes constant in the region of $M=1$ for the purpose of finding out the atmospheric pressure value, hence the value is limited to a region where a relationship of $Ps/Pa < 0.52828$ is established, i.e., the engine idling time. However, there was a point of problem such that, during the engine idling time, the engine operation was remarkably influenced by temperature, fluctuation in the degree of opening of the throttle valve, fluctuation in the air flow rate through the bypass at the time of total closure of the throttle valve, whereby precision in the atmospheric pressure value to be obtained was not satisfactory. For example, with the internal combustion engine having a displacement of 2 liters, the air flow rate during the engine idling is 3 g/sec., in contrast to which the leakage flow rate at the throttle section is up to about 0.5 g/sec. Moreover, a constant in a computation equation to find out the air flow rate from the degree of opening of the throttle valve and the internal pressure of the surge tank is a function of the air temperature which is substantially proportionate to a root value of an air temperature ratio. Furthermore, an error of the degree of opening of the throttle valve is also innegligible for the error, because of the air flow rate being small during the engine idling.

SUMMARY OF THE INVENTION

The present invention has been made with a view to solving the points of problem inherent in the conventional electronic control system, as described in the foregoing, and aims at providing an improved electronic control system for the internal combustion engine which is capable of obtaining the atmospheric pressure related values in high precision with an inexpensive construction and without use of an expensive atmospheric pressure sensor.

The electronic control system for the internal combustion engine according to the present invention is to find out, by a computing means, the atmospheric pressure related values from a charging efficiency, etc. which has been found by selective use of signals of an intake air quantity and a number of revolution of the internal combustion engine, by storing beforehand in a memory means, in the form of a two-dimensional map, the charging efficiency, etc. corresponding to a degree of opening of the throttle valve and a number of revolution of the engine under the reference atmospheric condition.

According to the present invention, in general aspect of it, there is provided an electronic control system for an internal combustion engine, in which parameters necessary for the engine control are found out by use of auxiliary quantities to thereby control the operating characteristic quantities of the internal combustion engine, the electronic control system comprising: memory means for storing in advance, in the form of a two-dimensional map, a charging efficiency per se or related values of the charging efficiency corresponding to a degree of opening of the throttle valve and a number of engine revolution under the reference atmospheric condition; and computing means for computing atmospheric pressure related values which include therein at least the atmospheric pressure value and are dependent on the atmospheric pressure, in accordance with a predetermined computation equation which takes a ratio of the charging efficiency per se or related values of the charging efficiency to be found out by selective use of signals of the intake air flow rate and a number of revolution of the internal combustion engine.

The foregoing object, other objects as well as specific construction and function of the electronic control system for the internal combustion engine according to the present invention will become more apparent and uderstandable from the following detailed description thereof, when read in conjunction with the accompanying drawing.

BRIEF DESCRIPTION OF THE ACCOMPANYING DRAWING

DETAILED DESCRIPTION OF PREFERRED EMBODIMENT

Figure 9:
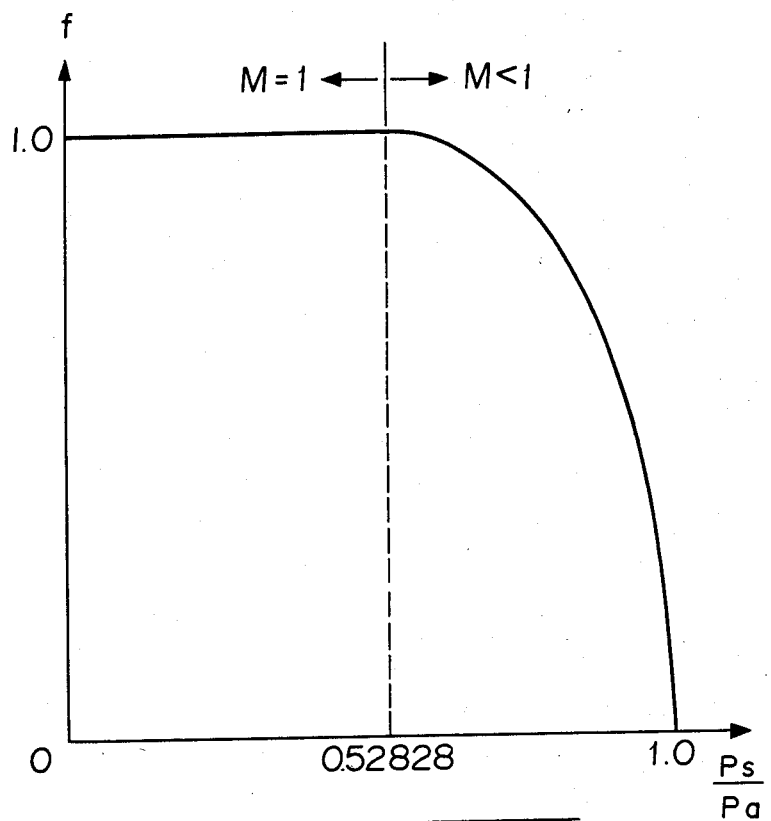
FIG. 9 is a graphical representation showing a relationship between pressure ratio and a value of "f".

The computing means according to the present invention finds out the atmospheric pressure related values in utilization of a phenomenon such that, by taking a ratio of the following value under the reference atmospheric condition and under a certain atmospheric condition at the same throttle valve opening degree and the same number of engine revolution, this ratio takes a substantially constant value, whereby a region represented by $M < 1$ in FIG. 9 is positively used:

$$\sqrt{\left(\frac{Ps}{Pa}\right)^{\frac{2}{K}} - \left(\frac{Ps}{Pa}\right)^{\frac{K+1}{K}}}$$

In the following, the present invention will be explained in reference to a preferred embodiment thereof shown in the accompanying drawing.

Figure 1:
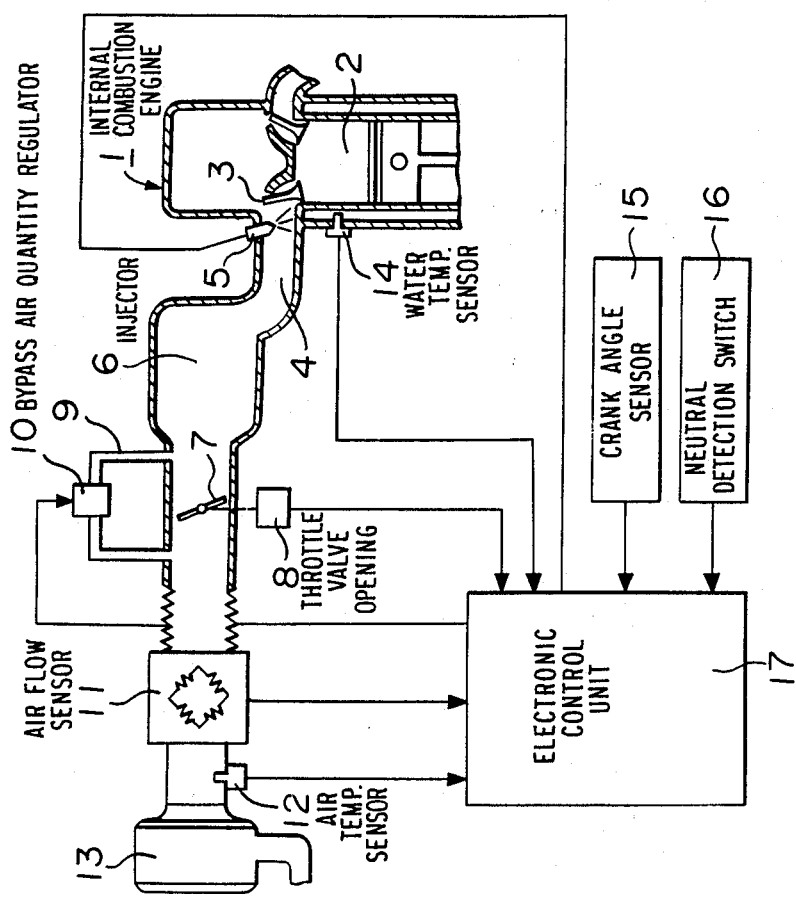
FIG. 1 is a diagram showing an entire structure of the electronic control system according to one preferred embodiment of the present invention.

FIG. 1 illustrates the electronic control system for the internal combustion engine according to one embodiment of the present invention, in particular, an overall construction of a hot-wire type fuel injection control system. Since the construction of this system has already been explained with regard to the prior art, except for the ECU 17, any details thereof will be dispensed with.

Figure 2:
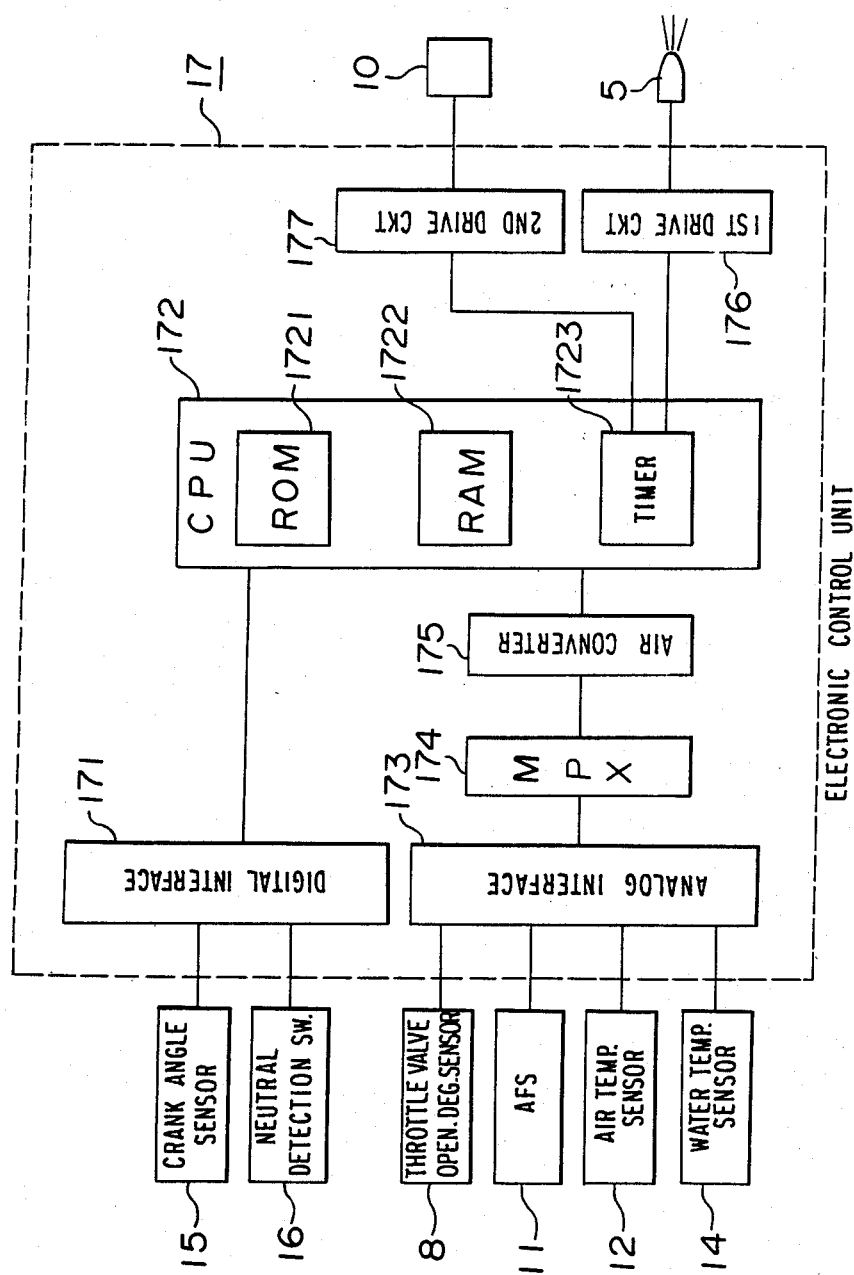
FIG. 2 is a block diagram showing the internal structure of the electronic control unit ECU in the whole construction of the system shown in FIG. 1.

FIG. 2 is a schematic block diagram showing the internal structure of the ECU 17 illustrated in FIG. 1. In the drawing, a reference numeral 171 designates a digital interface for input digital signals such as those from the crank angle sensor 15, the neutral detection switch 16, and so forth, an output from this digital interface being introduced into an input port or an interruption terminal of a CPU 172 (central processing unit) which is a well known micro-processor comprising a ROM 1721 storing therein the control programs and data for the flow process charts shown in FIGS. 4 to 7, a RAM 1722 functioning as the work memory, etc., and a timer 1723, this micro-processor generating, by way of a timer output, a fuel injection pulse width, for example, which has been computed by a predetermined control program; a numeral 173 refers to an analog interface for introducing as inputs thereinto various analog signals from the throttle valve opening degree sensor 8, the AFS 11, the air temperature sensor 12, the water temperature sensor 14, and so forth, outputs from this analog interface being sequentially selected by a multiplexer 174, converted into analog/digital signals by an A/D converter 175, and taken into the CPU 172 as the digital values; a reference numeral 176 designates a first drive circuit for driving the injector 5 with a fuel injection pulse width as computed by the CPU 172; and a reference numeral 177 denotes a second drive circuit for driving the bypass air quantity regulator 10 with an ISC drive pulse width as computed by the CPU 172 with a predetermined control program and generated by a timer output.

By the way, the CPU 172 stores in the ROM 1721 thereof, in the form of a two-dimensional map, the charging efficiency $\eta_{co}$ under the reference atmospheric conditions of the atmospheric pressure $P_0$ and the air temperature $T_0$ with the number of engine revolution and the throttle valve opening degree as the parameters, and also stores therein in advance those established values for the judgement and computation. Furthermore, the CPU 172 stores in the ROM 1721 thereof, in the form of a map, the maximum air flow rate value $Q_{max0}$, for example, under the reference atmospheric conditions with the number of engine revolution as the parameter.

In the following, the operations of the CPU 172 will be explained, in advance of which the theoretical background of the method for detecting the atmospheric pressure of the present invention will be elucidated.

Figure 3:
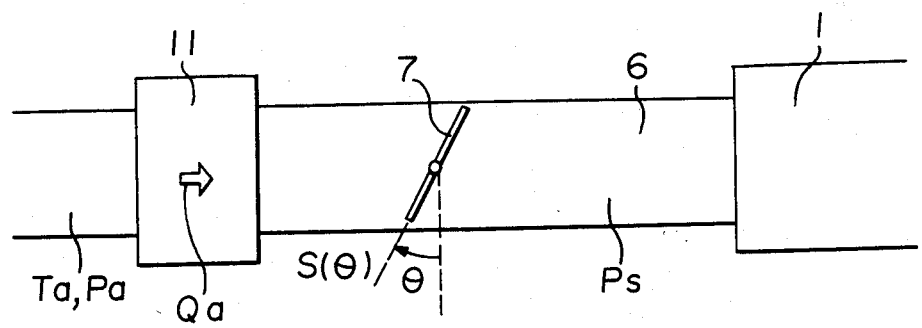
FIG. 3 is a schematic diagram showing an air intake section of the system shown in FIG. 1.

The principle of detecting the atmospheric pressure is as follows: in FIG. 3, it is assumed that the atmospheric pressure is Pa, the air (atmospheric) temperature is Ta, the intake air flow rate as measured by the AFS is Qa, the degree of opening of the throttle valve is $\theta$, an area for the air passing through the throttle section is $S(\theta)$, and the internal-pressure of the surge tank is Ps.

The flow rate Qt of air passing through the throttle section is represented by the following equation (1):

$$Qt = \sqrt{\frac{2K}{K-1}} \cdot \frac{Pa}{\sqrt{RTa}} \cdot S(\theta) \cdot \sqrt{\left(\frac{Ps}{Pa}\right)^{\frac{2}{K}} - \left(\frac{Ps}{Pa}\right)^{\frac{K+1}{K}}} \quad (1)$$

(where: K denotes a ratio of specific heat of air; and R represents a gas constant of air).

Also, the intake air flow rate Qe of the internal combustion engine is represented by the following equation (2).

$$Qe = N/30 \cdot V_H \cdot \rho_0 \cdot \eta_C \quad (2)$$

(where: N denotes a number of engine revolution (rpm): $V_H$ represents a stroke capacity; $\rho_0$ indicates air density under the reference atmospheric condition; and $\eta_C$ denotes the charging efficiency).

Here, the following equation (3) is established under the steady operating condition of the internal combustion engine:

$$Qa = Qt = Qe \quad (3)$$

From the equations (2) and (3), the charging efficiency $\eta_C$ is obtained by the following equation:

$$\eta_c = \frac{Qa}{\frac{N}{30} \cdot V_H \cdot \rho_0} \quad (4)$$

The following equation (5) is then derived from the equation (1) and (2), when Qt=Qe:

$$\sqrt{\frac{2K}{K-1}} \cdot \frac{Pa}{\sqrt{RTa}} \cdot S(\theta) \cdot \sqrt{\left(\frac{Ps}{Pa}\right)^{\frac{2}{K}} - \left(\frac{Ps}{Pa}\right)^{\frac{K+1}{K}}} = \frac{N}{30} \cdot V_H \cdot \rho_0 \cdot \eta_{co} \quad (5)$$

In the above equation (5), since Pa=P$_0$, Ta=T$_0$ under the reference atmospheric condition, the following equation (6) is derived:

$$\sqrt{\frac{2K}{K-1}} \cdot \frac{P_o}{\sqrt{RT_o}} \cdot S(\theta) \cdot \sqrt{\left(\frac{P_{so}}{P_o}\right)^{\frac{2}{K}} - \left(\frac{P_{so}}{P_o}\right)^{\frac{K+1}{K}}} = \frac{N}{30} \cdot V_H \cdot \rho_0 \cdot \eta_{co} \quad (5)$$

(where: $P_{so}$ denotes the internal pressure of the surge tank under the reference atmospheric condition; and $\eta_{co}$ represents the charging efficiency under the same condition).

Here, when the equation (5) is arranged by dividing it with the equation (6) for each side, taking into consideration a case wherein the degree of opening of the throttle valve and the number of engine revolution are the same, the following equation (7) is obtained;

$$\frac{Pa}{P_o} = \sqrt{\frac{Ta}{T_o}} \cdot \frac{\eta_c}{\eta_{co}} \cdot \sqrt{\frac{\left(\frac{P_{so}}{P_o}\right)^{\frac{2}{K}} - \left(\frac{P_{so}}{P_o}\right)^{\frac{K+1}{K}}}{\left(\frac{Ps}{Pa}\right)^{\frac{2}{K}} - \left(\frac{Ps}{Pa}\right)^{\frac{K+1}{K}}}} \quad (7)$$

In the above equation (7), the third term of the right side of approximated by a function with the atmospheric temperature Ta alone as the variable, as will be described later. Further, this third term has a smaller influence than that of the first term in the right side, hence the following approximate expressions (8a), (8b) and (8c) are obtained.

$$\frac{Pa}{P_o} \approx \sqrt{\frac{Ta}{T_o}} \cdot \frac{\eta_c}{\eta_{co}} \cdot g(Ta) \quad (8a)$$

$$\frac{Pa}{P_o} \approx \sqrt{\frac{Ta}{T_o}} \cdot \frac{\eta_c}{\eta_{co}} \quad (8b)$$

$$Pa \approx P_o \cdot \sqrt{\frac{Ta}{T_o}} \cdot \frac{\eta_c}{\eta_{co}} \quad (8c)$$

(where: g(Ta) denotes a function of Ta as the parameter).

Further, in the use of the atmospheric pressure related values, the following approximate expressions (8d) and (8e), from which the outside temperature Ta has been omitted, may be employed:

$$Pa/P_0 \approx \eta_C/\eta_{CO} \quad (8d)$$

$$Pa \approx P_0 \cdot \eta_C/\eta_{CO} \quad (8e)$$

In the following, explanations will be made as to the approximate expression of the third term in the right side of the above equation (7).

The afore-described equation (2) will be expressed by the following equations (2) when the volumetric efficiency $\eta_V$ is used:

$$Qe = (N/30) \cdot V_H \cdot \rho_S \cdot \eta_V \quad (2a)$$

(where: $\rho_S$ denotes the air density in the surge tank).

The value of $\eta_V$ is expressed by the following equation (9):

$$\eta_V = \epsilon/\epsilon - 1 \cdot \{1 - Pr/Ps \cdot 1/K\epsilon\} \quad (9)$$

(where: $\epsilon$ denotes a compression ratio; and Pr represents an exhaust pressure).

Also, $\rho_S$ is expressed by the following equation (10):

$$\rho_S = \rho_0 \cdot T_0/Ts \cdot Ps/P_0 \quad (10)$$

(where: $\rho_0$ denotes a reference atmospheric density; $T_0$ represents a reference atmospheric temperature; and $P_0$ indicates a reference atmospheric pressure).

Now, as is usually adopted, the approximation, in which the exhaust pressure Pr is equal to the atmospheric pressure Pa, is applied to the equation (9), while the approximation, in which the temperature in the surge tank Ts is equal to the atmospheric pressure Ta, is applied to the equation (10), whereby the equation (2a) may be expressed as follows:

$$Qe = N/30 \cdot V_H \cdot \rho_0 \cdot T_0 \cdot /Ta \cdot Ps/P_0 \cdot \epsilon/\epsilon - 1 \cdot \{1 - Pr/Ps \cdot 1/K\epsilon\} \quad (11)$$

Here, assuming that the equations (1) and (11) are equal, the following equation (12) is obtained.

$$\sqrt{\frac{2K}{K-1}} \cdot \frac{1}{\sqrt{RTa}} \cdot S(\theta) \cdot \sqrt{\left(\frac{Ps}{Pa}\right)^{\frac{2}{K}} - \left(\frac{Ps}{Pa}\right)^{\frac{K+1}{K}}} = \frac{N}{30} \cdot V_H \cdot \frac{\rho_0 T_0}{P_0 Ta} \cdot \frac{Ps}{Pa} \cdot \frac{\epsilon}{\epsilon-1} \cdot \left\{1 - \frac{1}{\frac{Ps}{Pa} \cdot K\epsilon}\right\} \quad (12)$$

The above equation (12) is expressed as $Ps/Pa = f(\theta, N, Ta)$, which does not depend on the atmospheric pressure Pa. In other words, when the throttle valve opening degree $\theta$ and the number of engine revolution N are determined, it has relationship with the outside temperature Ta alone.

When the value of Ps/Pa in the same degree of opening of the throttle valve and the same number of engine revolution is computed from the equation (12) with the throttle valve opening degree $\theta$, the number of engine revolution N, and the outside temperature Ta as the parameters, the change in the ratio becomes approximately 6% with respect to the change in the outside temperature of 50° C. Also, under the same conditions, a change in the ratio becomes less than 2% with the following third term in the right side of the equation (7):

$$\sqrt{\frac{\left(\frac{P_{so}}{P_o}\right)^{\frac{2}{K}} - \left(\frac{P_{so}}{P_o}\right)^{\frac{K+1}{K}}}{\left(\frac{Ps}{Pa}\right)^{\frac{2}{K}} - \left(\frac{Ps}{Pa}\right)^{\frac{K+1}{K}}}}$$

The above-mentioned error in the detection of the atmospheric pressure is usually a negligible one, hence the third term in the right side of the equation (7) can be ignored with the consequence that the approximate expressions (8b) and (8c) can be obtained.

Figure 4:
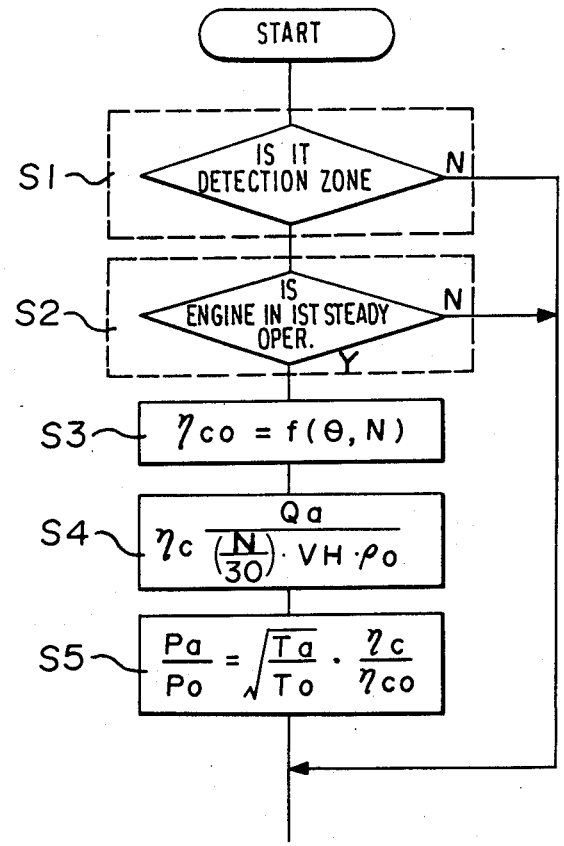
FIGS. 4 to 7 are respectively flow process charts, each showing the operations of the system according to the preferred embodiment of the present invention.

In the following, explanations will be given as to the flow process chart shown in FIG. 4 for obtaining a corrected value $Pa/P_0$ in conformity to the atmospheric pressure on the basis of the approximate expression (8b). In the flow process chart, the step S1 is a routine for discriminating the operating zone where the atmospheric pressure is detected, the details of which will be explained in reference to the flow process chart in FIG. 5. When it is in the detecting zone, the operational sequence proceeds to the step S2, and, when it is not, the operational sequence in FIG. 4 is terminated. The step S2 is a routine for judging whether the engine is in its steady operation, or not. When the engine is in the steady operation, the above-mentioned equation (3) is established, and the operational sequence proceeds to the step S3, and, when it is not in the steady operation, the operational sequence in FIG. 4 is terminated. At the step S3, two-dimensional maps of the throttle valve opening degree and the number of engine revolution are indexed by use of the signals of the throttle valve opening degree $\theta$ detected from the throttle valve opening degree sensor 8 and of the number of engine revolution N detected from the crank angle sensor 15, to thereby find out the charging efficiency $\eta_{C0}$ under the reference atmospheric condition. Subsequently, at the step S4, the current charging efficiency $\eta_C$ is found on the basis of the equation (4) by use of the above-mentioned signal N for the number of engine revolution, the air flow rate value from the AFS 11 (or the air flow rate value in FIG. 7 based on the detected value from the AFS 11) Qa, and the values of $V_H$ and $\rho_0$ which have been stored in advance. At the subsequent step S5, the corrected value of $Pa/P_0$ conformed to the atmospheric pressure is found on the basis of the approximate expression (8b) by use of the values $\eta_{C0}$ and $\eta_C$ as found above, the air temperature value Ta as detected by the air temperature sensor 12, and the air temperature value $T_0$ under the reference atmospheric condition as stored in advance.

Although, in the flow chart of FIG. 4, an example of finding out the corrected value of $Pa/P_0$ conformed to the atmospheric pressure has been shown, it may also be feasible that a value of the reference air flow rate $Q_0$ under the atmospheric condition is found at the step S3 with $Q_0$ being equal to $f(\theta,N)$, and then, at the step S5, the corrected value of $Pa/P_0$ conformed to the atmospheric pressure is found with $Pa/P_0$ being equal to $\sqrt{Ta/T_0} \cdot Qa/Q_0$, skipping the step S4. Further, the computation at the step S5 has been done by use of the approximate expression (8b), which may however be done by use of the approximate expression (8a) or (8d). In particular, when the expression (8d) is used, measurement of the air temperature is not necessary, hence the air temperature sensor 12 in FIG. 1 is no longer required, whereby the construction of the system becomes simplified.

Figure 5:
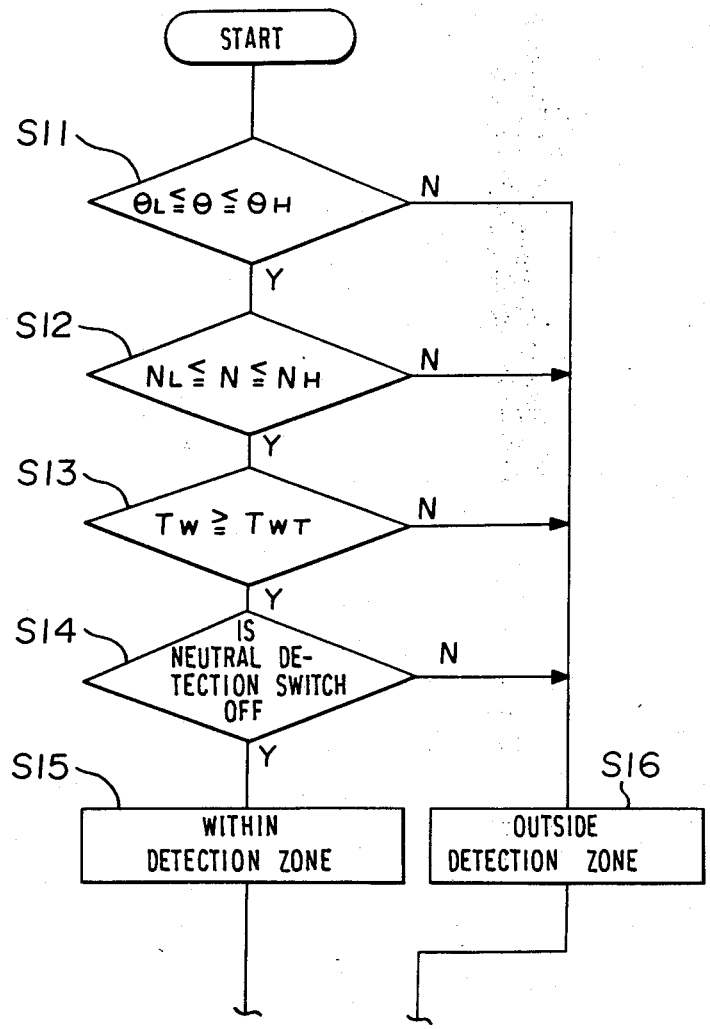

In the following, explanations will be given as to the judging process for the detecting zone in reference to the flow process chart in FIG. 5. The step S11 is a routine for judging whether the throttle valve opening degree $\theta$ detected by the throttle valve opening degree sensor 8 is within a predetermined range, or not. The lower limit value $\theta_L$ is selected to be larger than the value of the degree of opening of the throttle valve during the engine idling. The upper limit value $\theta_H$ is set within a range, in which no influence of reverse flow by the internal combustion engine emerges. As an example, when the degree of opening of the throttle valve during the engine idling is taken at 10 degrees, the valve of $\theta_L$ should desirably be 15 degrees, while $\theta_H$ be 30 degrees. When the throttle valve opening degree $\theta$ is in a predetermined range of above $\theta_L$ and below $\theta_H$, the operational sequence proceeds to the step S12, otherwise judgement is done at the step S16 to the effect that the range is outside the detecting zone. The step S12 is a routine for judging whether the number of engine revolution N detected by an output signal from the crank angle sensor 15 is within a predetermined range, or not. While there is no particular restriction to the upper and lower limit values $N_H$ and $N_L$, it is desirable that the number of engine revolution be established in its ordinary range of revolution of $N_L$ = approx. 1,000 rpm and $N_H$ = approx. 4,000 rpm. When the number of engine revolution is within a predetermined range of above $N_L$ and below $N_H$, the operational sequence proceeds to the step S13, otherwise judgement is made at the step S16 to the effect that the range is outside the detecting zone.

The step S13 is a routine for judging whether the temperature of water $T_W$ detected by the water temperature sensor 14 is above a predetermined value $T_{WT}$, or not. Usually, the value $T_{WT}$ is set in a range of from 60° C. to 80° C. This condition of water temperature is to take into consideration a case, wherein air is supplied to the internal combustion engine 1 from a section other than the throttle section where the throttle valve is provided, passing through the bypass 9 and the bypass air quantity regulator 10, at the time of the water temperature being low.

When the water temperature $T_W$ is above the predetermined value $T_{WT}$, the operational sequence proceeds to the step S14, otherwise judgement is made at the step S16 to the effect that the range is outside the detecting zone. The step S14 is a routine for judging, on the basis of an output from the neutral detection switch 16, whether the power transmission gear is in its neutral position or in its engaged position. The judgement can be done by providing, in the case of a manual transmission (M/T) vehicle, a neutral switch. In the case of an automatic transmission (A/T) vehicle, this judgement can be replaced by the judgement whether it is in the D-range or in the N-range. This judgement is done in such a manner as to eliminating fluctuation in the engine operating condition during the neutral position, hence the range is outside the detecting zone during the engine idling.

When the neutral detecting switch 16 is off and yet the transmission gear is not in the neutral position, the operational sequence proceeds to the step S15 to judge that the range is within the detecting zone. On the other hand, when the neutral detecting switch 16 is on and the transmission gear is in the neutral position, the judgement is made at the step S16 to the effect that the range is outside the detecting zone.

Figure 6:
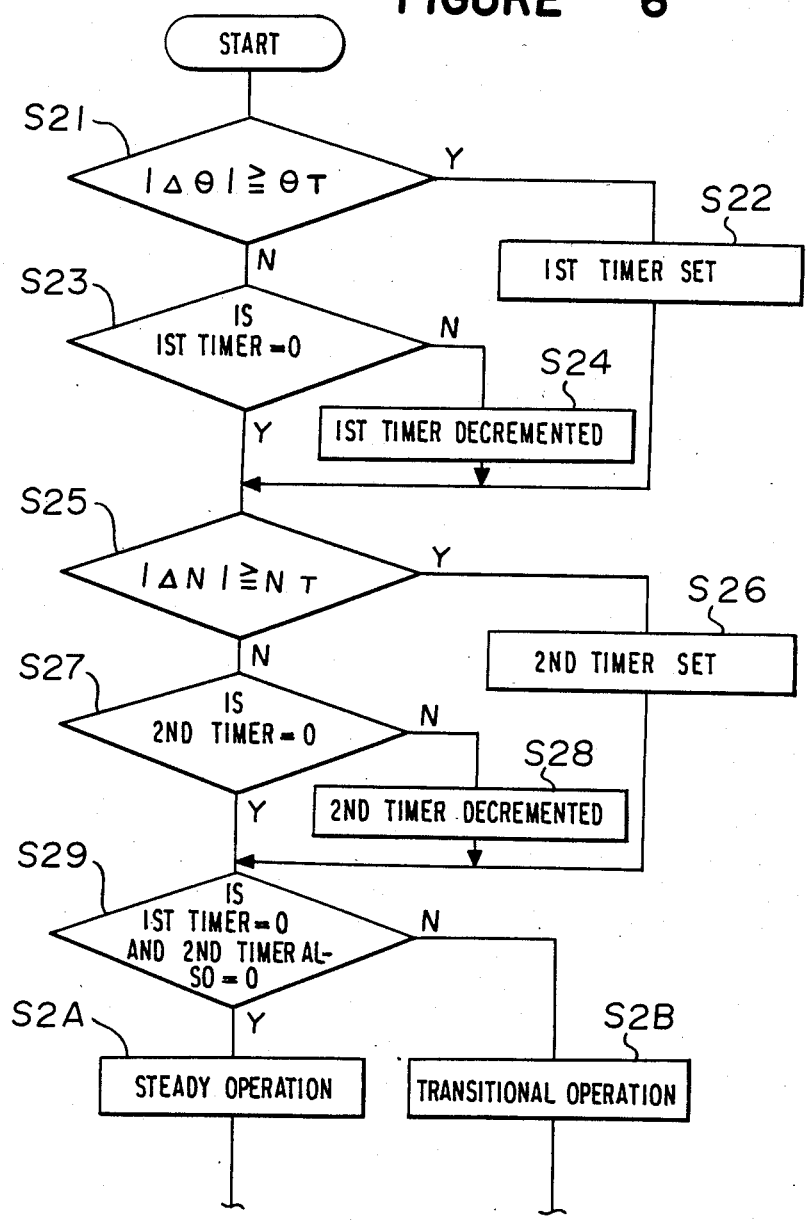

In the following, explanations will be given in reference to the flow chart in FIG. 6 as to the judging process during the steady engine operation. At the step S21, judgement is made as to whether the absolute value $|\Delta\theta|$ of the deviated value of the throttle valve opening degree at every predetermined time, which has been found from a routine (not shown in the flow chart in FIG. 6), is above the predetermined value $\theta_T$, or not. If the absolute value is above the predetermined value $\theta_T$, a given time is set in the first timer at the step S22. If the absolute value does not reach the predetermined value $\theta_T$, judgement is made at the step S23 as to whether the first timer is 0, or not. If the first timer is 0, the operational sequence proceeds to the step S25. On the contrary, when the first timer is not 0, it is decremented at the step S24. As has so far been described, in the same manner as in the process operations at the steps S21 to S24, the process for determining the number of engine revolution is carried out at the steps S25 to S28, provided that $|\Delta N|$ denotes an absolute value of the deviated value of the number of engine revolution, and $N_T$ is a predetermined value.

At the step S29, judgement is made as to whether the first and second timers are both 0, or not. When the conditions are met, judgement is made at the step S2A to the effect that the engine operation is steady. On the contrary, when the conditions are not met, judgement is made at the step S2B to the effect that the engine is in its transitional operation. In other words, during a predetermined time period from generation of the deviation in the throttle valve opening degree or the deviation in the number of engine revolution, both timers judge that the engine is in its transitional operation.

Figure 7:
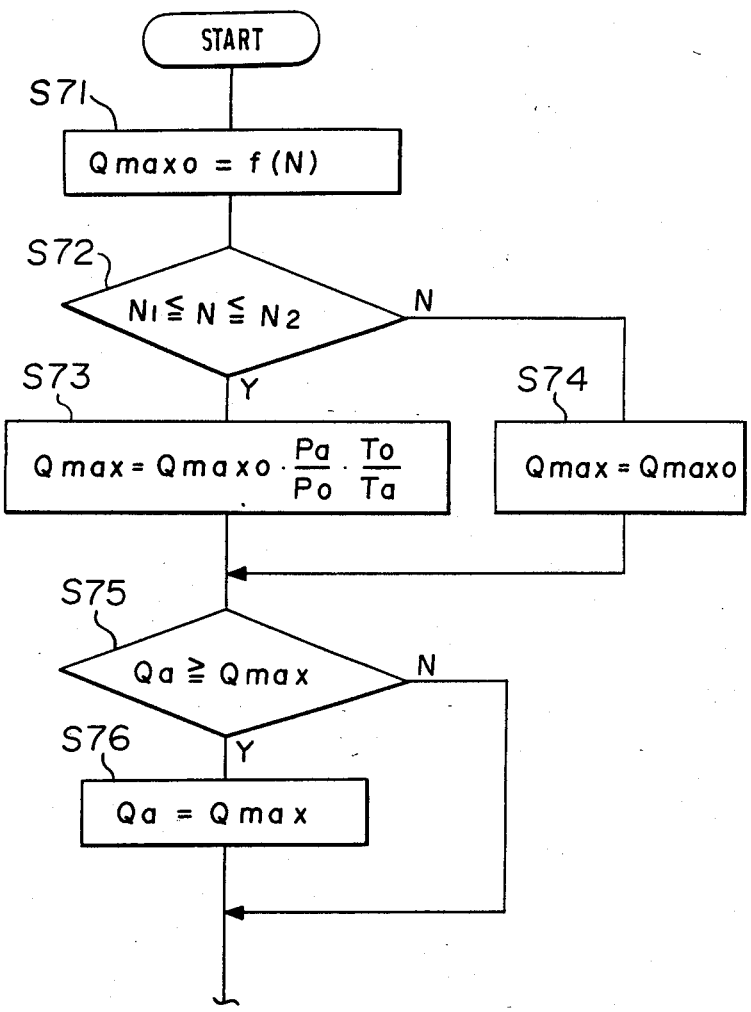
Figure 8:
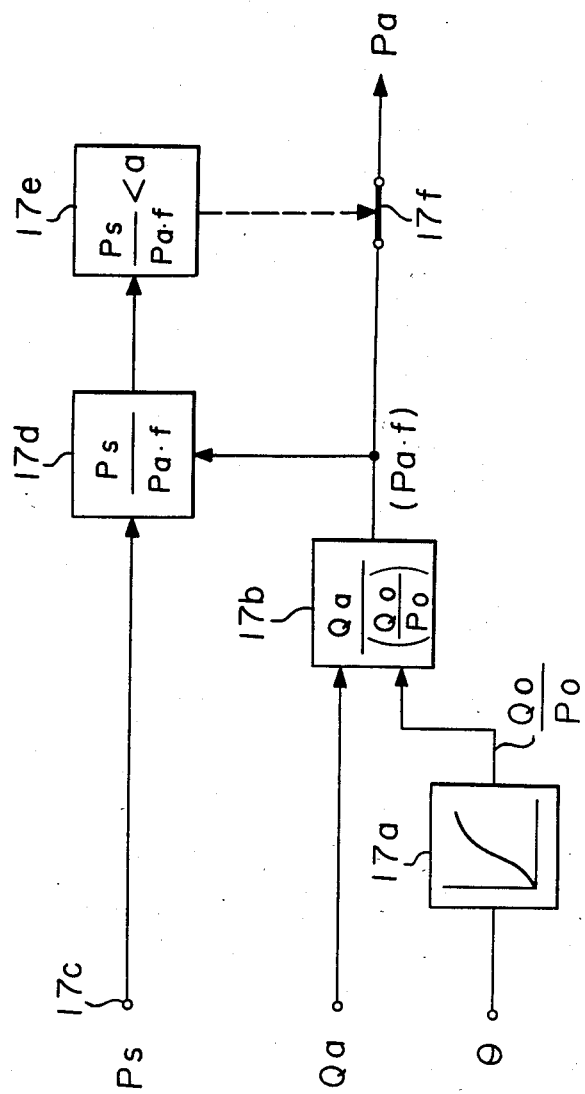
FIG. 8 is a block diagram showing a conventional electronic control system which produces an atmospheric pressure value.

FIG. 7 is a flow process chart of a routine for finding the air flow rate value Qa by use of the corrected value conformed to the atmospheric pressure. At the step S71, the maximum value of the air flow rate $Q_{max0}$ corresponding to each and every number of engine revolution under the reference atmospheric condition is found, in which f(N) designates a table for the maximum value of the air flow rate $Q_{max0}$ with the number of engine revolution as the argument number, from which a corresponding maximum value of the air flow rate $Q_{max0}$ is taken out from the number of engine revolution N derived on the basis of an output signal from the crank angle sensor 15.

At the step S72, judgement is made as to the reverse flow spitting region of the internal combustion engine 1 by the number of engine revolution; that is to say, when the number of engine revolution is in the reverse flow region within a range of from above $N_1$ to below $N_2$, the operational sequence proceeds to the step S73, otherwise it proceeds to the step S74. At the step S73, the above-mentioned maximum value of the air flow rate $Q_{max0}$ under the reference atmospheric condition is corrected in conformity to the atmospheric pressure and temperature to thereby find out the maximum value of the air flow rate $Q_{max0}$ under the current atmospheric condition from the following equation (13):

$$Q_{max} = Q_{max0} \cdot P_a/P_0 T_0/T_a \tag{13}$$

(where: $T_0$ denotes an air temperature value under the reference atmospheric condition; and $T_a$ indicates a current air temperature value detected by the air temperature sensor 12).

The third term in the right side for the air temperature correction of the above equation (13) may be omitted for the sake of simplification of the electronic control system, or be replaced with the corrected water temperature in utilization of the water temperature sensor 14.

At the step S74, the maximum value of the air flow rate $Q_{max0}$ under the reference atmospheric condition is substituted with $Q_{max}$. This process step is for a case, wherein use is made of the AFS which is capable of performing accurate measurement of the mass flow rate in the region other than the reverse flow region of the engine. In other case, no process is carried out at the steps S72 and S74. It is also possible to omit the processes at the steps S72 and S74 even in the case of using the AFS which is able to measure the mass flow rate accurately.

The step S75 subsequent to the step S73 or S74 is for comparing the air flow rate value Qa as measured and the above-mentioned maximum value of the air flow rate $Q_{max0}$.

When $Qa \geq Q_{max0}$, the value of Qa is restricted at the step S76 with $Q_{max}$. Also, when $Qa < Q_{max}$, no process is carried out, and the process steps in FIG. 7 are terminated.

Incidentally, in the above-described example of the present invention, the hot-wire type air flow sensor 11 is shown as the AFS. It may however be feasible that other types of the AFS for measurement of the air mass is employed. Further, the present invention may be applied to the AFS which measures the volume of air; for example, the following relationship will be established with a vane-type AFS:

$$Qa = \sqrt{\rho} \cdot Q_U \tag{14}$$

(where: Qa denotes a mass flow rate value; $\rho$ indicates an atmospheric density value; and $Q_U$ represents volumetric flow rate value). By use of the equations (4), (8b) and (14), the following equation can be derived:

$$\frac{P_a}{P_0} = \sqrt{\frac{T_a}{T_0}} \cdot \frac{Q_a}{Q_o} = \sqrt{\frac{T_a}{T_0}} \cdot$$

$$\frac{\sqrt{\rho_0 \cdot \frac{T_0}{T_a} \cdot \frac{P_a}{P_0}} \cdot Q_u}{\sqrt{\rho_0} \cdot Q_{uo}} = \sqrt{\frac{P_a}{P_0}} \cdot \frac{Q_u}{Q_{uo}}$$

hence, $P_a/P_0 = (Q_U/Q_{U0})^2$ (15)

$P_a = P_0 \cdot (Q_U/Q_{U0})^2$ (16)

(where: $Q_{U0}$ denotes a volumetric flow rate value of air under the reference atmospheric condition—a value which has been stored in advance as the two-dimensional map of the throttle valve opening degree $\theta$ and the number of engine revolution). As the consequence, the correct value conformed to the atmospheric pressure can be obtained from the above equation (15).

Furthermore, in the above described example, no corrective measures are taken against the influence of the air passing through the bypass air quantity regulator 10. However, the atmospheric pressure value may be corrected with the quantity of air passing through the bypass air quantity regulator 10, or its estimated quantity.

Although in the above described example, use is made of a corrected value of $P_a/P_0$ conformed to the atmospheric pressure, it may further be feasible to obtain the atmospheric pressure value Pa by multiplication of $P_0$ with a value obtained from the step S5, or by use of either one of the equations (8a) multiplied by the value $P_0$, (8c), (8e) and (16), in place of the steps S5. This atmospheric pressure value Pa can be used as in the above described example by dividing it with, for example, the value $P_0$, and so forth. For others, this atmospheric pressure value can be utilized for control of the fuel feeding quantity to the internal combustion engine, the ignition timing thereof, the desired number of engine revolution, the bypass air quantity in and through the engine, and other operational characteristic quantities.

As has so far been described, the electronic control system for the internal combustion engine according to the present invention is so constructed that the charging efficiency or its related values under the reference atmospheric condition are stored in advance in the form of two-dimensional map data of the throttle valve opening degree and the number of engine revolution, and that the atmospheric pressure related values are found from a charging efficiency found under a certain definite atmospheric condition or its related values and the previously stored values, hence the electronic control system according to the present invention can be effectively obtained at a low manufacturing cost and with high operating precision.

Although, in the foregoing, the present invention has been explained in detail with reference to the preferred embodiment thereof, it should be understood that this embodiment is only illustrative of the present invention and not so restrictive, and that any changes and modifications may be made by those persons skilled in the art within the spirit and scope of the invention as recited in the appended claims.

What is claimed is:

1. An electronic control system for internal combustion engine, in which parameters necessary for the engine control are found out by use of auxiliary quantities to thereby control the operating characteristic quantities of the internal combustion engine, said electronic control system comprising: memory means for storing in advance, in the form of a two-dimensional map, at least one parameter selected from the group comprising a charging efficiency per se and related values of the charging efficiency corresponding to a degree of opening of the throttle valve and a number of engine revolution under a reference atmospheric condition; and computing means for computing atmospheric pressure related values which include therein at least the atmospheric pressure value and are dependent on the atmospheric pressure, in accordance with a predetermined computation equation which takes a ratio of a parameter selected from the group comprising a charging efficiency per se and related values of the charging efficiency to be found out by selective use of signals of the intake air flow rate and a number of revolution of the internal combustion engine.

2. The electronic control system for internal combustion engine according to claim 1, wherein said computing means corrects the atmospheric pressure relates values in conformity to the temperature with an atmospheric temperature value from an air temperature sensor and an atmospheric temperature value which has been determined in advance under reference atmospheric conditions.

3. The electronic control system for internal combustion engine according to claim 1, further comprising limiting means containing therein, as the upper limit value, a value which has been obtained by correcting, with the atmospheric pressure related values, the maximum charging efficiency which has been established beforehand in correspondence to the number of engine revolution under the reference atmospheric condition or the maximum related value of said maximum charging efficiency, with respect to an air flow rate value from the air flow sensor, at the time of finding out the intake air flow rate value of the internal combustion engine as the control parameter.

4. The electronic control system for internal combustion engine according to claim 3, wherein said limiting means limits a region to be corrected with the atmospheric pressure related value within a range of the number of engine revolution which includes a reverse-flowing region of the internal combustion engine.

5. The electronic control system for internal combustion engine according to claim 1, wherein said computing means computes the atmospheric pressure related values, when the operating range of the internal combustion engine is a partial range.

* * * * *